United States Patent [19]

Brothers et al.

[11] Patent Number: 4,941,536
[45] Date of Patent: Jul. 17, 1990

[54] SET RETARDED CEMENT COMPOSITIONS AND METHODS FOR WELL CEMENTING

[75] Inventors: Lance E. Brothers, Ninnekah; Donald W. Lindsey, Marlow; Dralen T. Terry, Duncan, all of Okla.

[73] Assignee: Halliburton Company, Duncan, Okla.

[21] Appl. No.: 372,976

[22] Filed: Jun. 27, 1989

[51] Int. Cl.⁵ .................... E21B 33/138; E21B 33/14
[52] U.S. Cl. .................... 166/293; 106/84; 106/803; 524/5
[58] Field of Search .................. 166/293, 295, 283; 106/90, 98, 315; 523/130

[56] References Cited

U.S. PATENT DOCUMENTS

| | | | |
|---|---|---|---|
| 3,929,741 | 12/1975 | Laskey . | |
| 4,015,991 | 4/1977 | Persinski et al. | 166/293 X |
| 4,500,357 | 2/1985 | Brothers et al. | 166/293 X |
| 4,515,216 | 5/1985 | Childs et al. | 166/293 |
| 4,515,635 | 5/1985 | Rao et al. | 106/90 |
| 4,524,828 | 6/1985 | Sagins et al. | 166/293 |
| 4,582,139 | 4/1986 | Childs et al. | 166/283 X |
| 4,703,801 | 11/1987 | Fry et al. | 166/293 |
| 6,646,942 | 2/1987 | Brothers | 523/130 |

*Primary Examiner*—George A. Suchfield
*Attorney, Agent, or Firm*—Robert A. Kent

[57] ABSTRACT

Set retarded cement compositions for cementing across a zone or zones in a well having enhanced compressive strength and rapid gel strength development after placement. The cement compositions are comprised of hydraulic cement, sufficient fresh water to form a pumpable slurry, a set retarder comprising a copolymer of 2-acrylamido, 2-methylpropane sulfonic acid and acrylic acid having an average molecular weight below about 5000 and any other desired additives. Methods of cementing utilizing the cement composition also are provided.

12 Claims, No Drawings

SET RETARDED CEMENT COMPOSITIONS AND METHODS FOR WELL CEMENTING

BACKGROUND OF THE INVENTION

1. Field of the Invention

This invention relates generally to set retarded cement compositions and methods of cementing across zones in wells, and more particularly, but not by way of limitation, to set retarded cement compositions having enhanced compressive strength development after placement and methods of cementing across zones in wells using such compositions.

2. Description of the Prior Art

In cementing operations carried out in oil, gas and water wells, a hydraulic cement is normally mixed with sufficient water to form a pumpable slurry and the slurry is pumped across a subterranean zone or zones to be cemented by way of the wellbore penetrating such zone. After placement across the zone or zones, the cement slurry sets into a hard mass.

While cement compositions are utilized in carrying out a variety of operations in wells to accomplish a variety of purposes, cement compositions are most commonly used in primary cementing whereby casing and/or liners are bonded within the wellbore to the formations penetrated thereby. Cementing is accomplished by introducing a cement composition into the annular space between the casing or liner and the wellbore, generally by pumping the cement composition downwardly within the casing o liner to the bottom thereof and then upwardly into the annulus, and then allowing the cement composition to set into a hard mass therein.

One or more of the formations or zones adjacent the cemented annulus can contain fluids under pressure which enter and flow through the cement-containing annulus when the cementing procedure carried out therein is faulty or inadequate. The most common problem of this nature is the flow or migration of gas in the cemented annulus. Such gas can flow to the surface, create communication between producing or other subterranean formations or zones and can, when in high enough volume, create blowouts during the cementing operation between when the cement composition is placed and before the cement composition has set into a hard mass. Minor interzonal gas flow problems can lower production. When the magnitude of leakage requires remedial action, expensive secondary cementing procedures must be carried out.

The occurrence of annular gas or fluid flow in a cemented casing-wellbore annulus is believed to relate to the inability of the cement slurry to transmit hydrostatic pressure during the transition of the slurry from a true fluid to a hard, set mass. During this transition phase, initial hydration has begun and the slurry starts to develop static gel strength. Although the system has little or no compressive strength at this point, the cement column becomes partially self-supporting. This is a very critical period as far as potential gas entry into the cement column is concerned. That is, although the original hydrostatic pressure is trapped within the gelled cement matrix, any volume reductions of the aqueous phase at this point result in rapid decreases in the hydrostatic pressure due to the low compressibility of the fluid phase. Such volume reductions usually occur due to the ongoing hydration reactions and due to the loss of part of the fluid phase to the formation (fluid loss). In this situation, it is possible for the pressure within the cement matrix to fall below the gas or fluid entry limit and for gas or fluid migration to occur.

Static gel strength is the development of some internal rigidity in the matrix of the cement that will resist a force placed upon it. The development of static gel strength will start to occur shortly after pumping has stopped and will continue to increase until the cement is set. At some time before actual set, the cement will develop a static gel strength high enough to prevent a fluid from moving through it. Tests have indicated that a gel strength of 500 pounds per 100 square feet is sufficient to prevent any movement, although at certain conditions such gel strength can be considerably lower. When the cement has developed a static gel strength high enough to prevent formation fluids from moving through it, the cement is said to have completed its transition phase.

Traditionally, the petroleum industry has attempted to prevent annulus formation fluid flow by increasing the cement slurry density, improving mud displacement, controlling mud-cement slurry compatibility, using fluid loss control additives, causing the cement slurry to expand after setting, and multiple stage cementing. Although these techniques are helpful and have shown some measure of success, none have completely solved the problems.

Another problem often encountered in cementing relates to the cement slurry developing compressive strength at a slow rate and/or the compressive strength development of the in-place cement column not being uniform. With the drilling of wells for the production of hydrocarbons to increased depths during recent years, extended cementing times are required to mix cement compositions and pump them into the annular space in the wells. In addition, at the greater depths, elevated temperatures are encountered which accelerate the normal setting rates of cement compositions to the point where the pumping times, i.e., the mixing and placement times, exceed the pumpable times of the cement compositions, making it difficult or impossible to place the cement compositions at the desired locations in the wells. In order to increase the pumpable times of cement compositions, various set retarding additives have been utilized in cement compositions. While such additives successfully extend the pumpable times between mixing and the setting of cement compositions, they are temperature sensitive, i.e., the higher the temperature of the cement slurry, the greater the quantity of set retarder additive required. In cementing operations, especially when a long liner is involved, the static temperature of the cement column at the top thereof after placement can be considerably lower than the static temperature of the column at the bottom of the annulus, i.e., at the bottom hole static temperature (BHST). In some cementing applications, the static temperature of the cement column at the top can be as much as 40° F. cooler than the BHST. In these applications, the cement slurries must contain set retarders in quantities to achieve required pumpable times at the highest temperature to which the cement slurry is heated, and consequently, after placement the cooler slurry at the top of the cement column can take an excessive time to set and to develop compressive strength whereby the continuation of well operations is delayed By the present invention, set retarded cement compositions for cementing across zones in wells are provided which have enhanced gel strength and compressive strength development after placement in the annulus. That is, the cement compositions develop high gel strength in a short period of time after placement followed by rapid compressive strength development. The rapid development of high gel strength in a short time span prevents fluid invasion into the annulus containing the cement composition even though the hydrostatic pressure of the cement column may fall below the pressure of formation fluids during the transition of the slurry to a solid mass.

SUMMARY OF THE INVENTION

A set retarded cement composition for cementing across a zone or zones in a well having enhanced compressive strength development after placement in the annulus is provided. The composition is comprised of hydraulic cement, sufficient fresh water to form a pumpable slurry which will set into a hard mass, one or more conventional fluid loss additives and a set retarder comprising a copolymer of 2-acrylamido, 2-methylpropane sulfonic acid (hereinafter AMPS, a registered trademark of THE LUBRIZOL CORPORATION) and acrylic acid. The copolymer comprises from about 40 to about 60 mole percent AMPS with the balance comprising acrylic acid. The set retarder has an average molecular weight below about 5000 such that a 10% aqueous solution of the copolymer has a Brookfield viscosity reading at 20 rpm of the U.L. Adapter Spindle in the range of from about 2 to less than 5 centipoise. The composition also may include any other conventional additives which do not adversely react with the set retarder. Additionally, methods of cementing a conduit in a borehole penetrating an earthen formation by introducing such a cementing composition into the space between such conduit and formation are disclosed.

DESCRIPTION OF PREFERRED EMBODIMENTS

The cement compositions of the present invention are comprised of pumpable aqueous hydraulic cement slurries containing various components which, after placement in an annulus to be cemented, set into hard masses having required compressive strengths. While various hydraulic cements can be utilized in forming the slurries, Portland cement is preferably utilized and can be, for example, one or more of the various types identified as API Classes A–H and J cements. These cements are identified and defined in API Specification for Materials and Testing for Well Cements, API spec. 10, Fourth edition, Aug. 1, 1988, of the American Petroleum Institute which is incorporated herein by reference.

The thickening and initial set times of cement compositions are strongly dependent upon temperature and pressure. To obtain optimum results in oil, gas and water well applications, a variety of additives are often included in the cement compositions to vary the cement slurry density, increase or decrease strength, accelerate or retard thickening time, control fluid loss, reduce slurry viscosity, increase resistance to corrosive fluids, etc. Essentially, a cement meeting the specifications of the American Petroleum Institute is mixed with water and other additives to provide a cement slurry appropriate for the conditions existing in each individual well to be cemented.

In accordance with the present invention, a set retarded cement composition for cementing across a zone or zones in a well having enhanced and uniform compressive strength development after placement in the annulus is provided. The composition is comprised of hydraulic cement, sufficient fresh water to form a pumpable slurry which will set into a hard mass, and a set retarder and any other desired conventional additives, such as fluid loss additives. The fresh water generally may be present in an amount of from about 30 to about 60 percent by weight of the dry cement. It is to be understood that both larger and smaller amounts of water may be utilized in specific applications.

The set retarder comprises a copolymer of 2-acrylamido, 2-methylpropane sulfonic acid (AMPS) and acrylic acid. The copolymer comprises from about 40 to about 60 mole percent AMPS with the balance comprising acrylic acid. Preferably, the copolymer comprises from about 45 to about 55 mole percent AMPS and most preferably about 50 mole percent AMPS. The set retarder has an average molecular weight below about 5000 and preferably below about 4000 such that a 10% aqueous solution of the copolymer has a Brookfield viscosity reading at 20 rpm of the U.L. Adapter Spindle in the range of from about 2 to less than 5 centipoise. As used herein, the phrase "average molecular weight" is intended to mean a weight average molecular weight such as may be determined by gel permeation chromatography. Numerous salts of the copolymer can be made by methods well known in the art. The preferred salts are made by neutralization of the acid form of the AMPS monomer or the copolymer with an alkaline agent such as a source of sodium, ammonium ions or the like. Such alkaline agents can comprise, for example, sodium hydroxide, ammonia and the like. However, it is to be understood that any alkaline agent which does not adversely react with the monomers of the copolymer or the other constituents of the cementing composition may be utilized. As used hereinafter, the term copolymer is intended to include both the acid form of the copolymer and its various salts.

The set retarder comprising the AMPS/acrylic acid copolymer may be manufactured in accordance with various well known free-radical techniques or any other technique which produces a copolymer having the previously identified properties. The AMPS/acrylic acid copolymer is present in the cement composition in an effective amount to retard the setting of the composition. Although the amount of the AMPS/acrylic acid copolymer present in the cement composition may be varied, the copolymer generally is admixed in the cementing composition in an amount of from about 0.1 to about 5 percent by weight of dry cement.

Preferably, the copolymer is present in an amount of from about 0.3 to about 1.5 percent by weight of dry cement. The amount of the copolymer admixed in the cement composition will depend upon the temperature level to be experienced, rheological considerations, and other additives which are present.

When the formation into which the cement composition is to be placed has a temperature above about 275° F., the cement composition may include a compound capable of providing borate ions such as potassium pentaborate or borax in the composition. Preferably, at such elevated temperature conditions, the borate ion providing compound is present in an amount of at least 0.5 percent by weight of dry cement and most preferably at least about 1.0 percent by weight of dry cement. In general, the borate ion source may be used in an amount sufficient to provide a ratio of AMPS/acrylic acid copolymer to borate source of from 1:0.5 to about 1:1.5 and preferably about 1:1. When borate ions are present in the cement composition and the bottom hole circulating temperature is above 275° F., the copolymer generally is present in an amount in excess of 3 percent by weight of dry cement and most preferably at least 3.5 percent by weight of dry cement.

In carrying out the method of the present invention, a set retarded cement composition is prepared by admixing in a suitable vessel the hydraulic cement, fresh water, set retarder and other desired additives to form a slurry. The set retarded cement compositions then are pumped into a wellbore or conduit across an interval or zone to be cemented and then allowed to set into a hard mass. Upon discontinuance of the pumping, static gel strength rapidly develops during the transition phase in the cement composition followed by uniform development of compressive strength. The pumping time of the cement composition can be controlled through inclusion of the set retarder for periods in excess of 4 hours at bottom hole circulating temperatures of up to 250° F. and in excess of 325° F. when a suitable quantity of borate ions also are present in the cement composition.

The AMPS/acrylic acid copolymer of the present invention has been found to be particularly useful in the formulation of light weight cement slurries. Light weight cement slurries typically are utilized when it is necessary to avoid excessive hydrostatic pressure on a subterranean formation. Certain subterranean formations are sufficiently pressure sensitive that the hydrostatic pressure created by a column of cement within a borehole can fracture the subterranean formation. Once fractured, the cement slurry then often flows into undesired portions of the formation through the fractures or may be subjected to undesired fluid loss into the formation through the fractures resulting in a failure to place the cement in the desired zones or poor bonding and compressive strength. Light weight cement slurries are prepared by incorporation of microfine particulate silica in the cement composition to reduce the density of the cement. The particulate silica can be present in an amount of from about 10 to about 40 percent by weight of dry cement, the particle size of the silica can be in the range of from about 0.02 to about 0.5 micron. It is to be understood that larger particle size silica also may be present. The use of the particulate silica permits cement compositions having a density in the general range of from about 11 to about 14 lbs/gal to be prepared. Typically, in prior art conventional light weight cement slurries, lignosulfonate-type retarders were utilized to control thickening time without hindering ultimate strength development. Surprisingly, it has been found that the AMPS/acrylic acid copolymer of the present invention when used in the concentrations previously described in place of a conventional lignosulfonate-type retarder in a light weight cement composition provides better concentration versus thickening time response than that provided by the lignosulfonate-type retarders. The copolymer generally results in substantially quicker compressive strength development while providing substantially similar ultimate compressive strengths.

While the specific mechanism is unknown, it is believed that the AMPS/acrylic acid copolymer retards the cement by disrupting the solution chemistry of the hydrating cement in contrast to the mechanism of lignosulfonate-type retarders which disrupt hydration by adsorption onto the surfaces of the cement particles. The particulate silica in the light weight cement slurries with its significant surface area also adsorbs the lignosulfonate-type retarders thereby disrupting the retardation process. The retarding effect of the copolymer of the present invention, however, is not affected by the presence of the silica particles in the cement slurries.

In order to facilitate a clear understanding of the methods and compositions of this invention and not by way of limitation, the following Examples are provided.

EXAMPLE I

A series of tests were conducted to determine the effect of the set retarder on cement slurry rheology, thickening time, fluid loss and thixotropy. The cement slurries were prepared by dry blending all the constituents with the cement prior to addition of water. Fresh water then was admixed with the dry constituents to form a slurry in a Waring Blendor. Transition times were determined by heating the slurry to the bottomhole circulating temperature at the same rate at which the thickening time was determined. The slurry then was stirred an additional 15 minutes at the bottomhole circulating temperature prior to the static gel strength measurement. The transition time is the time required for the static cement slurry to develop 500 lbs/100 ft.$^2$ of gel strength. All of the remaining tests were performed in accordance with the API procedures set forth in API Spec 10 entitled "API Specification For Materials And Testing For Well Cements," 4th Ed., 1988.

The cement slurries which were tested comprised Lone Star class H cement, 35 percent silica flour, by weight of cement, a fluid loss additive as identified in the following Tables and either 54 or 42 percent fresh water by weight of cement to provide a slurry density of 15.9 or 16.9 lb/gal, respectively. The set retarder was admixed with the slurry in the amount set forth in the Tables.

TABLE I

| | Thickening Time and Transition Time of 15.9 lb/gal Cement Slurries FLUID LOSS ADDITIVE | | | | | | | |
|---|---|---|---|---|---|---|---|---|
| Test No. | Set Retarder (% by Wt. of Cement) | Anionic Copolymer[1] (% by Wt. of Cement) | CMHEC[2] (% by Wt. of Cement) | Thickening Time/Transition Time[3] (Hr:Min) | | | | |
| | | | | 150° F. | 180° F. | 200° F. | 220° F. | 245° F. |
| 1 | 1.5 | 0.5 | 0 | — | — | — | — | 5:34 (0:20) |
| 2 | 0.5 | 0 | 0.5 | — | 4:48 (0:25) | 3:45 | — | — |
| 3 | 0.75 | 0 | 0.5 | — | — | 7:43 (0:25) | 4:57 (0:26) | 3:10 |
| 4 | 1.0 | 0 | 0.5 | — | — | — | — | 4:01 (0:22) |
| 5 | 1.5 | 0 | 0.5 | — | — | — | — | 5:37 |

TABLE I-continued

Thickening Time and Transition Time of 15.9 lb/gal Cement Slurries

| | | FLUID LOSS ADDITIVE | | | | | |
|---|---|---|---|---|---|---|---|
| Test No. | Set Retarder (% by Wt. of Cement) | Anionic Copolymer[1] (% by Wt. of Cement) | CMHEC[2] (% by Wt. of Cement) | Thickening Time/Transition Time[3] (Hr:Min) | | | |
| | | | | 150° F. | 180° F. | 200° F. | 220° F. | 245° F. |
| | | | | | | | | (0:20) |

[1]copolymer of N,N dimethylacrylamide and 2-acrylamido, 2-methylpropane sulfonic acid described in U.S. Pat. No. 4,515,635
[2]CMHEC: carboxymethylhydroxyethyl cellulose
[3]transition time in parenthesis

TABLE II

Thickening Time and Transition Time of 16.9 lb/gal Cement Slurries
FLUID LOSS ADDITIVE

| Test No. | Set Retarder (% by Wt. of Cement) | CMHEC[1] (% by Wt. of Cement) | Thickening Time/Transition Time[2] (Hr:Min) | | | | |
|---|---|---|---|---|---|---|---|
| | | | 150° F. | 180° F. | 200° F. | 220° F. | 245° F. |
| 1 | 0.4 | 0.5 | 3:07 (0:22) | — | — | — | — |
| 2 | 0.5 | 0.5 | 4:53 (0:25) | 4:38 (0:20) | 4:41 (0:32) | — | — |
| 3 | 0.8 | 0.5 | — | 8:27 (0:23) | 7:27 (0:19) | — | — |
| 4 | 1.0 | 0.5 | — | — | 7:36 (0:23) | 5:10 (0:13) | 3:44 |
| 5 | 1.3 | 0.5 | — | — | — | 6:39 (0:14) | 4:27 (0:22) |
| 6 | 1.5 | 0.5 | — | — | — | — | 4:40 (0:19) |

[1]CMHEC: carboxymethylhydroxyethyl cellulose
[2]transition time in parenthesis

The foregoing data clearly illustrates the operability of the set retarder of the present invention in providing controllable set retardation and rapid static gel strength development upon placement.

EXAMPLE II

A series of tests were conducted to determine the effect of particulate silica on the AMPS/acrylic acid copolymer of the present invention in comparison to conventional lignosulfonate-type retarders.

The cement slurries were prepared by dry blending all the constituents with the cement prior to addition of water. Fresh water then was admixed with the dry constituents to form a slurry in a Waring Blendor. Thickening times then were determined by heating the cement slurry of test numbers 1-3 to 325° F. and 4-11 to 153° F. as described in Example I.

The cement slurries which were tested comprised in test numbers 1-3: 43% class H cement, 17% 0.02 to 0.5 micron silica, 17% flyash, 23% silica flour, 3% by weight of cement grafted lignite described in U.S. Pat. No. 4,703,801, 0.6% by weight of cement hydroxyethylcellulose, 155% by weight of cement water and the quantity of copolymer and borax set forth in the Table III to yield a cement having a density of approximately 13.5 lb/gal. Test numbers 4-11 utilized a cement slurry comprising: 56% class H cement, 22% flyash, 22% to 0.5 micron silica, 0.5% by weight of cement hydroxyethylcellulose, 160% by weight of cement water and the quantity of retarder set forth in Table IV to yield a cement having a density of approximately 13.2 lb/gal.

TABLE III

| Test No. | Set retarder percent by weight of cement | Borax percent by weight of cement | Thickening Time Hours:Minutes |
|---|---|---|---|
| 1 | 2.5 | 2.5 | 2:46 |
| 2 | 3.0 | 3.0 | 6:03 |
| 3 | 3.5 | 3.5 | 7:20 |

TABLE IV

| Test No. | Set Retarders AMPS/acrylic acid copolymer percent by weight of cement flyash and silica | Conventional lignosulfonate-type percent by weight of cement flyash and silica | Compressive Strength Development[1] | | |
|---|---|---|---|---|---|
| | | | Thickening Time Hours:Min | Time To 50 psi, Hours:Min | 24 hr compressive strength, psi |
| 4 | 0.5 | 0 | 2:29 | — | — |
| 5 | 0.7 | 0 | 5:00 | 12:35 | 3430 |
| 6 | 0.9 | 0 | 6:45 | — | — |
| 7 | 1.1 | 0 | 9:37 | — | — |
| 8 | 0 | .5 | 3:06 | — | — |
| 9 | 0 | .6 | 6:30 | — | 1640 |
| 10 | 0 | .7 | 6:42 | 32:02 | <50 |
| 11 | 0 | .9 | 7:45 | — | — |

[1]curing conditions: 180° F. at 3000 psi

The foregoing data clearly illustrate the controlled retardation possible with the copolymer of the present invention in comparison to conventional retarders in light weight cement slurries without loss of rapid compressive strength development.

EXAMPLE III

A cement job was performed in Latimer County, Okla. to set a liner from a depth of about 12,600 feet to about 6,700 feet using a light weight cement slurry. The bottom hole circulating temperature was 190° F. and the temperature at the top of the liner was 170° F. The lead cement composition comprised 56% class H cement, 22°% flyash, 22% particulate silica, 1.1% by weight of cement AMPS/acrylic acid copolymer, 1.2% by weight of cement hydroxyethylcellulose and 168% by weight of cement fresh water to yield a slurry with a density of about 12.4 lb/gal. The cement slurry had a thickening time of three hours and forty minutes at the bottom hole circulating temperature. The cement was mixed, pumped and displaced with a cement plug landing to indicate complete displacement of the cement from the liner. The cement composition had a 48 hour compressive strength of 1420 psi at the top of the liner.

While that which currently is considered to be the preferred embodiment of the invention has been described herein, it is to be understood that variations and modifications which will be apparent to those skilled in the art can be made in this invention without departing from the spirit or scope of the invention as set forth in the appended claims.

What is claimed is:

1. A method of cementing a subterranean zone penetrated by a wellbore comprising the steps of:
    forming a pumpable set retarded cement slurry comprising hydraulic cement, fresh water, a set retarder comprising a copolymer consisting essentially of 2-acrylamide, 2-methylpropane sulfonic acid (AMPS) and acrylic acid having an average molecular weight below about 5000 and comprising from about 40 to about 60 mole percent AMPS and a fluid loss additive;
    pumping said cement slurry into said zone by way of said wellbore; and
    allowing said cement slurry to set therein.

2. The method of claim 1 wherein said copolymer comprises from about 45 to about 55 mole percent AMPS.

3. The method of claim 1 wherein said copolymer comprises about 50 mole percent AMPS.

4. The method of claim 1 wherein said set retarder is present in an amount of from about 0.1 to about 5 percent by weight of hydraulic cement.

5. The method of claim 1 wherein said set retarder is present in an amount of from about 0.3 to about 1.5 percent by weight of hydraulic cement.

6. A method of cementing a zone in a subterranean formation penetrated by a wellbore comprising the steps of:
    forming a pumpable set retarded cement slurry comprising hydraulic cement, fresh water, particulate silica having a particle size in the range of from about 0.02 to about 0.5 micron and a set retarder comprising a copolymer consisting essentially of 2-acrylamido, 2-methylpropane sulfonic acid (AMPS) and acrylic acid having an average molecular weight below about 5000 and comprising from about 40 to about 60 mole percent AMPS;
    pumping said cement slurry into said zone by way of said wellbore, and
    allowing said cement slurry to set therein.

7. The method of claim 6 wherein said copolymer comprises from about 45 to about 55 mole percent AMPS.

8. The method of claim 6 wherein said copolymer comprises about 50 mole percent AMPS.

9. The method of claim 6 wherein said set retarder is present in an amount of from about 0.1 to about 5 percent by weight of hydraulic cement.

10. The method of claim 6 wherein said cement slurry also includes a source of a borate specie.

11. The method of claim 10 wherein said borate source is present in an amount of from about ½ to 1½ times the amount of set retarder present in said cement slurry.

12. The method of claim 6 wherein said set retarder is present in an amount of from about 0.3 to about 1.5 percent by weight of hydraulic cement.

* * * * *